United States Patent [19]
Dahlman et al.

[11] Patent Number: 5,883,899
[45] Date of Patent: Mar. 16, 1999

[54] CODE-RATE INCREASED COMPRESSED MODE DS-CDMA SYSTEMS AND METHODS

[75] Inventors: Erik Dahlman, Bromma; Per Hans P. Willars, Stockholm; Olof E. Grimlund, Bromma; Lars-Magnus Ewerbring, Stockholm, all of Sweden

[73] Assignee: Telefonaktiebolaget LM Ericsson, Stockholm, Sweden

[21] Appl. No.: 636,646

[22] Filed: Apr. 23, 1996

Related U.S. Application Data

[63] Continuation-in-part of Ser. No. 431,458, May 1, 1995, Pat. No. 5,533,014.

[51] Int. Cl.$^6$ .............................. H04J 3/16; H04J 3/22; H04J 3/06; H04B 7/216
[52] U.S. Cl. ...................... 370/468; 370/320; 370/342; 370/504; 371/43.2
[58] Field of Search ........................... 370/203, 206–208, 370/468, 320, 328, 336, 342, 345, 350, 504; 375/200, 206; 371/43–46

[56] References Cited

U.S. PATENT DOCUMENTS

| | | | |
|---|---|---|---|
| 4,653,076 | 3/1987 | Jerrim et al. | 375/115 |
| 4,930,140 | 5/1990 | Cripps et al. | 375/1 |
| 5,042,082 | 8/1991 | Dahlin | 455/33 |
| 5,095,540 | 3/1992 | Reed | 455/73 |
| 5,101,501 | 3/1992 | Gilhousen et al. | 455/33 |
| 5,103,459 | 4/1992 | Gilhousen et al. | 375/1 |
| 5,109,528 | 4/1992 | Uddenfeldt | 455/33.2 |
| 5,152,919 | 10/1992 | Kitamura et al. | 252/299.61 |
| 5,157,661 | 10/1992 | Kanai et al. | 370/95.1 |
| 5,166,951 | 11/1992 | Schilling | 375/1 |
| 5,175,867 | 12/1992 | Wejke et al. | 455/33.1 |
| 5,239,557 | 8/1993 | Dent | 375/1 |
| 5,274,667 | 12/1993 | Olmstead | 375/1 |
| 5,373,502 | 12/1994 | Turban | 370/18 |
| 5,383,219 | 1/1995 | Wheatley, III et al. | 375/1 |
| 5,533,014 | 7/1996 | Willars et al. | 370/18 |
| 5,712,868 | 1/1998 | Stern | 375/200 |

FOREIGN PATENT DOCUMENTS

| | | |
|---|---|---|
| 652650 | 5/1995 | European Pat. Off. . |
| 681376 | 11/1995 | European Pat. Off. . |
| 51-2943 | 1/1976 | Japan . |
| 63-318837 | 12/1988 | Japan . |
| 5-102943 | 4/1993 | Japan . |
| WO94/29980 | 12/1994 | WIPO . |
| WO94/29981 | 12/1994 | WIPO . |
| WO95/08901 | 3/1995 | WIPO . |

OTHER PUBLICATIONS

*Digital Communications*, Second Edition, John G. Proakis, pp. 441–443 (1989).

"Multiple Access Options for Cellular Based Personal Communications", *IEEE Vehicular Technology Conference*, Håkan Eriksson et al., pp. 1–6, (May 18–20, 1993).

"On the System Design Aspects of Code Division Multiple Access (CDMA) Applied to Digital Cellular and Personal Communications Networks", Allen Salmasi et al., *1991 IEEE*, pp. 57–62.

"Second Generation Wirelss Information Networks", David J. Goodman, *IEEE Transactions on Vehicular Technology*, vol. 40, No. 2, pp. 366–374 (May, 1991).

"Trends in Cellular and Cordless Communications", David J. Goodman, *Jun. 1991 IEEE Communications Magazine*, pp. 31–40.

"Techniques to Provide Seamless Handover for a DS–CDMA System", Håkan Persson et al., 5 pages, RACE Workshop, Metz (18 Jun. 1993).

*Primary Examiner*—Douglas W. Olms
*Assistant Examiner*—David R. Vincent
*Attorney, Agent, or Firm*—Burns, Doane, Swecker & Mathis, L.L.P.

[57] ABSTRACT

Introduction of discontinuous transmission in CDMA communications techniques is achieved by using selectively puncturing coded output of a convolutional encoder. By temporarily increasing the coding rate during a frame, information only fills an information part of a frame in a compressed mode, leaving an idle part of the frame in which to perform other functions, such as evaluation of other frequencies for use in handover between frequencies.

40 Claims, 6 Drawing Sheets

NORMAL MODE TRANSMISSION

COMPRESSED MODE TRANSMISSION

CODE-RATE INCREASED COMPRESSED MODE DS-CDMA SYSTEMS AND METHODS

RELATED APPLICATIONS

This application is a continuation-in-part of U.S. Ser. No. 431,458, now U.S. Pat. No. 5,533,014 entitled "NON-CONTINUOUS TRANSMISSION FOR SEAMLESS HANDOVER IN DS-CDMA SYSTEMS" to Willars et al., which application was originally filed on Jun. 14, 1993. The disclosure of that application is expressly incorporated here by reference. This application is also related to U.S. patent application Ser. No. 08/636,648 entitled "MULTI-CODE COMPRESSED MODE DS-CDMA SYSTEMS AND METHODS" to E. Dahlman et al., which application was filed on the same date as the present application and which disclosure is also expressly incorporated here by reference.

BACKGROUND

The present invention relates to the use of Code Division Multiple Access (CDMA) communications techniques in cellular radio telephone communication systems, and more particularly, to a method and system related to handover of connections between frequencies using non-continuous Direct Sequence-Code Division Multiple Access (DS-CDMA) transmissions.

DS-CDMA is one type of spread spectrum communication. Spread spectrum communications have been in existence since the days of World War II. Early applications were predominantly military oriented. However, today there has been an increasing interest in using spread spectrum systems in commercial applications. Some examples include digital cellular radio, land mobile radio, satellite systems and indoor and outdoor personal communication networks referred to herein collectively as cellular systems.

Currently, channel access in cellular systems is achieved using Frequency Division Multiple Access (FDMA) and Time Division Multiple Access (TDMA) methods. In FDMA, a communication channel is a single radio frequency band into which a signal's transmission power is concentrated. Interference with adjacent channels is limited by the use of band pass filters which pass substantial signal energy only within the specified frequency band. Thus, with each channel being assigned a different frequency band, system capacity is limited by the number of available frequency bands as well as by limitations imposed by frequency reuse.

In TDMA systems which do not employ frequency hopping, a channel consists of a time slot in a periodic train of time intervals over the same frequency band. Each period of time slots is called a frame. A given signal's energy is confined to one of these time slots. Adjacent channel interference is limited by the use of a time gate or other synchronization element that passes signal energy received at the proper time. Thus, the problem of interference from different relative signal strength levels is reduced.

With FDMA or TDMA systems (or hybrid FDMA/TDMA systems), one goal is to insure that two potentially interfering signals do not occupy the same frequency at the same time. In contrast, Code Division Multiple Access (CDMA) is an access technique which uses spread spectrum modulation to allow signals to overlap in both time and frequency. There are a number of potential advantages associated with CDMA communication techniques. The capacity limits of CDMA-based cellular systems are projected to be higher than that of existing analog technology as a result of the properties of wideband CDMA systems, such as improved interference diversity and voice activity gating.

In a direct sequence (DS) CDMA system the symbol stream to be transmitted (i.e., a symbol stream which has undergone channel encoding etc.) is impressed upon a much higher rate data stream known as a signature sequence. Typically, the signature sequence data (commonly referred to as "chips") are binary or quaternary, providing a chip stream which is generated at a rate which is commonly referred to as the "chip rate". One way to generate this signature sequence is with a pseudo-noise (PN) process that appears random, but can be replicated by an authorized receiver. The symbol stream and the signature sequence stream can be combined by multiplying the two streams together. This combination of the signature sequence stream with the symbol stream is called spreading the symbol stream signal. Each symbol stream or channel is typically allocated a unique spreading code. The ratio between the chip rate and the symbol rate is called the spreading ratio.

A plurality of spread signals modulate a radio frequency carrier, for example by quadrature phase shift keying (QPSK), and are jointly received as a composite signal at a receiver. Each of the spread signals overlaps all of the other spread signals, as well as noise-related signals, in both frequency and time. If the receiver is authorized, then the composite signal is correlated with one of the unique codes, and the corresponding signal can be isolated and decoded.

For future cellular systems, the use of hierarchical cell structures will prove valuable in even further increasing system capacity. In hierarchical cell structures, smaller cells or micro cells exist within a larger cell or macro cell. For instance, micro cell base stations can be placed at a lamp post level along urban streets to handle the increased traffic level in congested areas. Each micro cell might cover several blocks of a street or a tunnel, for instance while a macro cell might cover a 3–5 Km radius. Even in CDMA systems, the different types of cells (macro and micro) will operate at different frequencies so as to increase the capacity of the overall system. See, H. Eriksson et al., "Multiple Access Options For Cellular Based Personal Comm.," *Proc. 43rd Vehic. Tech. Soc. Conf.*, Secaucus, 1993. Reliable handover procedures must be supported between the different cell types, and thus between different frequencies so that mobile stations which move between cells will have continued support of their connections.

There are several conventional techniques for determining which new frequency and cell should be selected among plural handover candidates. For example, the mobile station can aid in the determination of the best handover candidate (and associated new base station) to which communications are to be transferred. This process, typically referred to as mobile assisted handover (MAHO), involves the mobile station periodically (or on demand) making measurements on each of several candidate frequencies to help determine a best handover candidate based on some predetermined selection criteria (e.g., strongest received RSSI, best BER, etc.). In TDMA systems, for example, the mobile station can be directed to scan a list of andidate frequencies during idle time slot(s), so that the system will determine a reliable handover candidate if the signal quality on its current link degrades beneath a predetermined quality threshold.

In conventional CDMA systems, however, the mobile station is continuously occupied with receiving information from the network. In fact, CDMA mobile stations normally continuously receive and transmit in both uplink and downlink directions. Unlike TDMA, there are no idle time slots available to switch to other carrier frequencies, which creates a problem when considering how to determine whether handover to a given base station on a given frequency is appropriate at a particular instant. Since the mobile station cannot provide any inter-frequency measurements to a handover evaluation algorithm operating either in the network or the mobile station, the handover decision will be made without full knowledge of the interference situation experienced by the mobile station, and therefore can be unreliable.

One possible solution to this problem is the provision of an additional receiver in the mobile unit which can be used to take measurements on candidate frequencies. Another possibility is to use a wideband receiver which is capable of simultaneously receiving and demodulating several carrier frequencies. However, these solutions add complexity and expense to the mobile unit.

In the parent patent application to Willars et al., this problem is addressed by introducing discontinuous transmission into CDMA communications techniques. For example, a compressed transmission mode is provided using a lower spreading ratio (i.e., by decreasing the number of chips per symbol) such that with a fixed chip rate the spread information only fills a part of a frame. This leaves part of each frame, referred to therein as an idle part, during which the receiver can perform other functions, such as the evaluation of candidate cells at other frequencies for purposes of handover.

This solution is readily applicable to CDMA systems wherein non-orthogonal code words are used to spread the information data sequence. In these types of systems, commonly referred to as "long code" systems, one signature sequence is much longer than one symbol (often billions of symbols long). Since these codes are non-orthogonal to begin with, temporarily changing the spreading ratio of one or several channels to provide compressed mode transmissions does not create extra inter-code interference.

The solution proposed in the parent application becomes problematic, however, for DS-CDMA systems where orthogonal code words are used to spread data streams. In so-called "short" code systems, a short code set (e.g., including 128 codes of length 128 chips) is chosen so that all codes are orthogonal to each other over one symbol interval, i.e., over the length of the code. Consequently, the number of chips per symbol, i.e. the spreading ratio, cannot be changed on one or several channels.

Accordingly, it would be desirable to provide a DS-CDMA system in which transmission and reception was discontinuous but which did not rely on a reduction in the spreading ratio to provide idle time for the receiver to measure on different frequencies.

SUMMARY

Introduction of discontinuous transmission in CDMA communications techniques is achieved by, for example, using selectively punctured coded output of a convolutional encoder. By temporarily increasing the coding rate during a frame, the coded information only fills an information part of a frame in a compressed mode, leaving an idle part of the frame in which to perform other functions, such as evaluation of other frequencies for use in handover between frequencies. A mode control device can, for example, switch an encoded signal stream output from a convolutional encoder between a first signal processing branch associated with a normal mode of transmission and a second signal processing branch associated with a compressed mode of transmission, the latter of which includes a code puncturing unit.

BRIEF DESCRIPTION OF THE DRAWINGS

The foregoing, and other, features, objects and advantages of the present invention will become apparent from the detailed description set forth below when read in conjunction with the drawings, in which.

DETAILED DESCRIPTION

In the following description, for purposes of explanation and not limitation, specific details are set forth, such as particular circuits, circuit components, techniques, etc. in order to provide a thorough understanding of the invention. For example, various details are provided relating to exemplary modulation and transmitting techniques. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
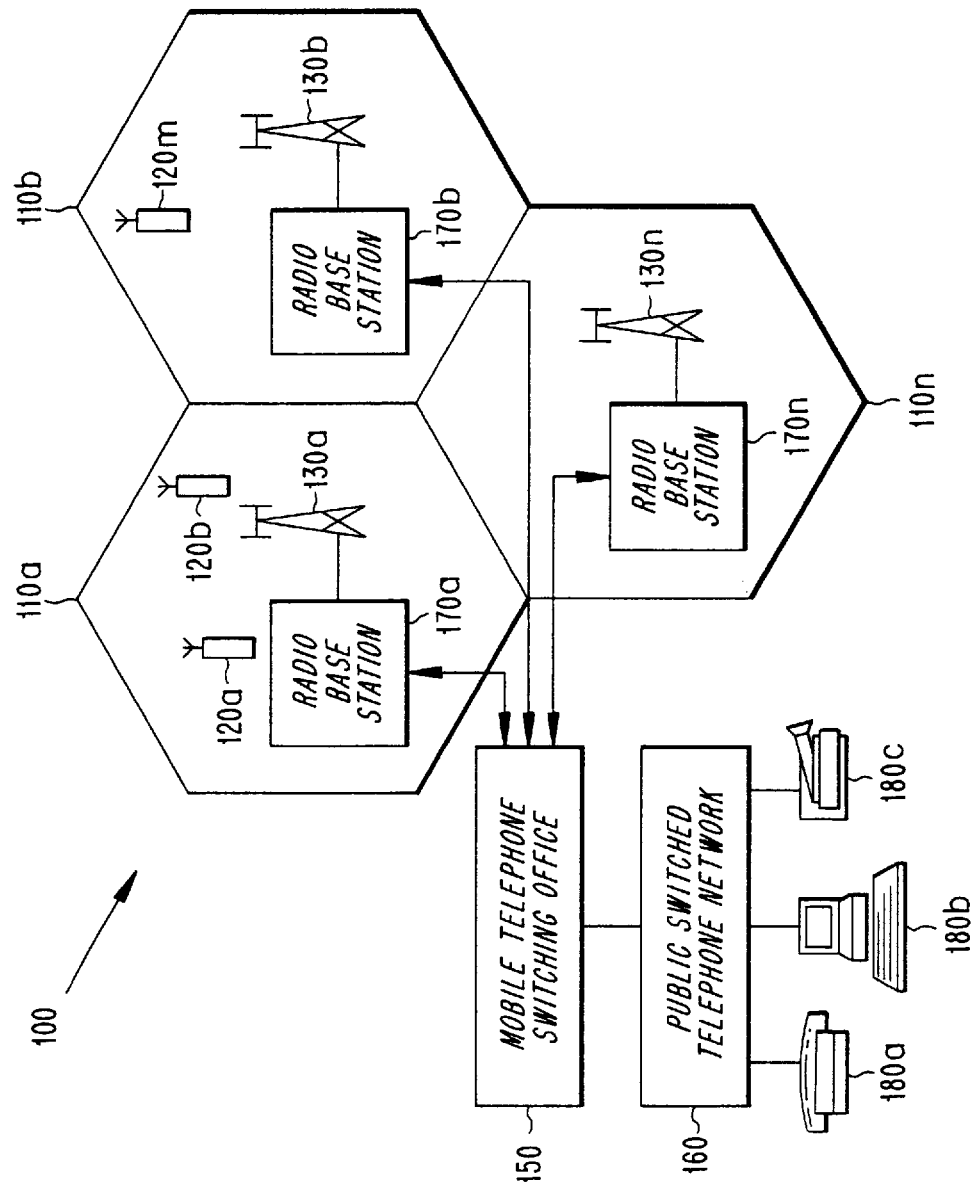
FIG. 1 is a schematic illustration of a cellular radio communications system.

An exemplary cellular radio communication system 100 is illustrated in FIG. 1. As shown in FIG. 1, a geographic region served by the system is subdivided into a number, n, of smaller regions of radio coverage known as cells 110*a*–n, each cell having associated with it a respective radio base station 170*a*–n. Each radio base station 170*a*–n has associated with it a plurality of transmit and receive radio antennas 130*a*–n. Note that the use of hexagonal-shaped cells 110*a*–n is employed as a graphically convenient way of illustrating areas of radio coverage associated with a particular base station 170*a*–n. In actuality, cells 110*a*–n may be irregularly shaped, overlapping, and not necessarily contiguous. Each cell 110*a*–n may be further subdivided into sectors according to known methods. Distributed within cells 110*a*–n are a plurality, m, of mobile stations 120*a*–m. In practical systems the number, m, of mobile stations is much greater than the number, n, of cells. Base stations 170*a*–n comprise inter alia a plurality of base station transmitters and base station receivers (not shown) which provide two-way radio communication with mobile stations 120*a*–m located within their respective calls. As illustrated in FIG. 1, base stations 170*a*–n are coupled to the mobile telephone switching office (MTSO) 150 which provides inter alia a connection to the public switched telephone network (PSTN) 160 and henceforth to communication devices 180*a*–c. The cellular concept is known to those skilled in the art and, therefore, is not further described here.

According to the present invention radio communications between the base stations and the mobile stations are effected using direct sequence code division multiple access (DS-CDMA). In the following, the term downlink, or forward channel, refers to the radio transmission of information bearing signals from base stations 170a–n to mobile stations 120a–m. Similarly, the term uplink, or reverse channel, refers to the radio transmission of information bearing signals from mobile stations 120a–m to base stations 170a–n.

Today, radio communication systems are being used for an ever increasing array of applications. Traditional voice communications now coexist with the radio transmission of images, and a mix of other medium and high speed data applications. Such applications require a radio channel capable of conveying a variable mix of low, medium, and high bit rate information signals with a low transmission delay. To make efficient use of the radio spectrum, only that bandwidth which is needed for a particular application should be allocated. This is know as "bandwidth on demand." Accordingly, the following exemplary systems describe a multi-rate, DS-CDMA system.

Downlink

Figure 2A:
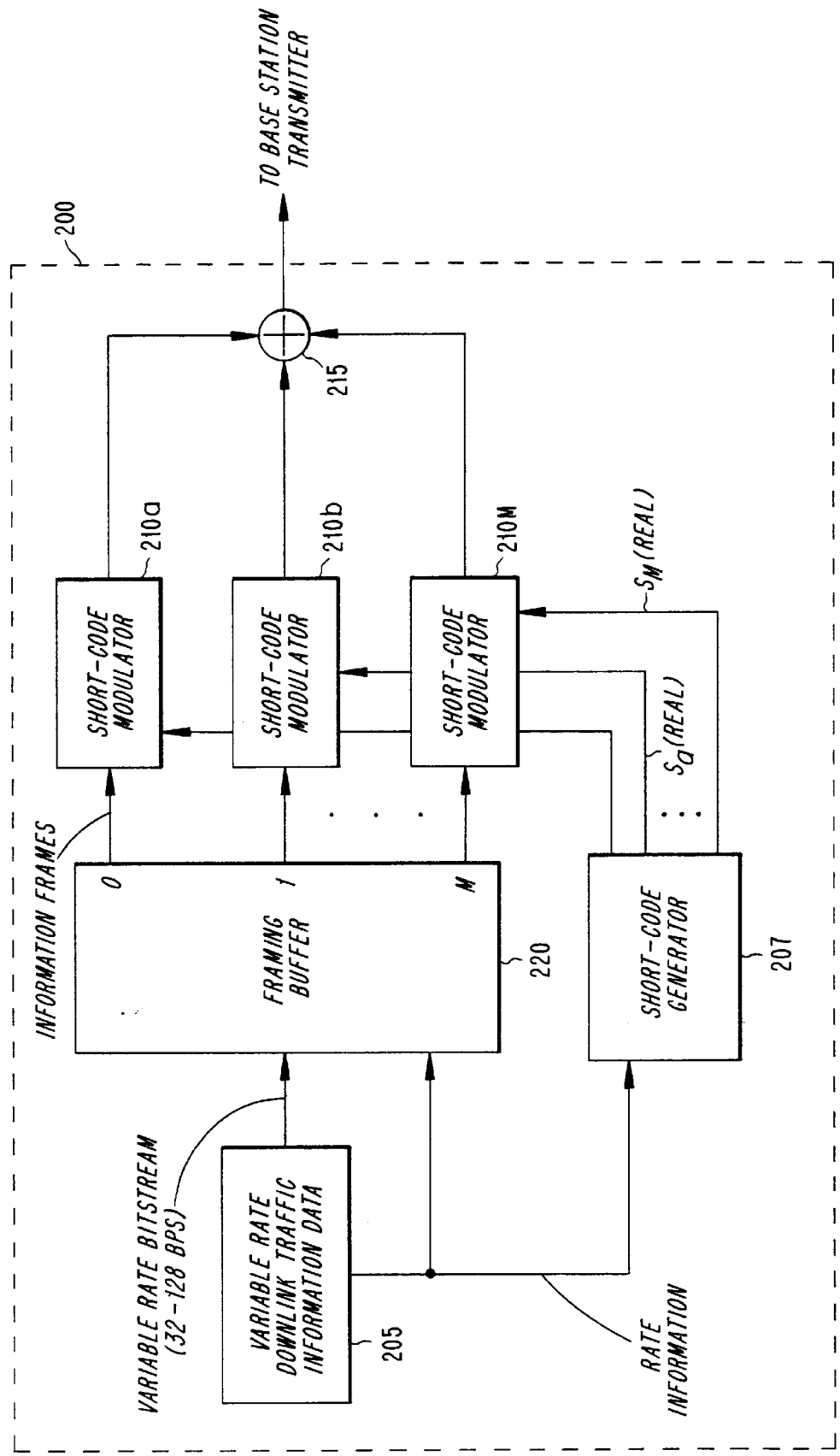
FIG. 2A is a schematic illustration of a downlink traffic information processor in accordance with the present invention.

FIG. 2A illustrates a schematic block diagram of a downlink traffic information processor 200. Downlink traffic information processor 200 is part of the base station transmitter. Each downlink connection requires the resources of at least one downlink traffic information processor 200. A base station which is dimensioned to supply a number K of simultaneous downlink connections should have at least an equal number K of downlink traffic information processors 200. Referring to FIG. 2A, variable rate downlink traffic information data 205 such as, for example, speech or image information originating from an information source (not shown), is received by framing buffer 220 in the form of a variable rate digital bitstream. The information source may be, for example, an ordinary telephone 180a, a computer 180b, a video camera 180c, or any other suitable information source which is linked via PSTN 160 to MTSO 150, or to MTSO 150 directly, and henceforth coupled to base stations 170a–n according to known methods.

The bitrate (i.e., number of kilobits per second (kbps)) of the variable rate bitstream received by framing buffer 220 is dependent upon the type or amount of information to be transmitted to mobile stations 120a–m. The bitrate may be defined by a Basic Bitrate and multiples thereof, i.e.:

Bitrate=(Basic Bitrate) *k; k=0,1,2, . . . N where (Basic Bitrate) * N is the maximum bitrate.

In an exemplary embodiment having a Basic Bitrate of 32 kbps and an information frame time interval of 10 ms, each information frame comprises 320 bits. For bitrates higher than 32 kbps, more than one information frame per 10 ms time interval is produced. As an example, suppose that the bitrate is 128 kbps. Then, four information frames, each comprising 320 bits, are produced for each 10 ms time interval. In general, the number M of information frames is the same as the number k of multiples of the Basic Bitrate.

Referring again to FIG. 2A, each information frame is coupled to one of a plurality of so-called short-code modulators 210a–M for subsequent processing. The number M of short-code modulators 210a–M is equal to the number N of possible multiples of the Basic Bitrate. According to the first exemplary embodiment of the present invention, when the received information data bitrate is the Basic Bitrate (e.g., 32 kbps) only one information frame is produced for each 10 ms time interval which is coupled to short-code modulator 210a. When the received variable rate bitstream is two times the Basic Bitrate (i.e., 64 kbps) two information frames are produced for each 10 ms time interval: one information frame is coupled to short-code modulator 210a and the other information frame is coupled to short-code modulator 210b.

Similarly, higher received variable rate bitstream produce a greater number of information frames per predetermined time interval. Each information frame resulting from high bitrate information data is separately coupled to a separate short-code modulator resulting in a plurality of so-called parallel short-code channels.

Figure 2B:
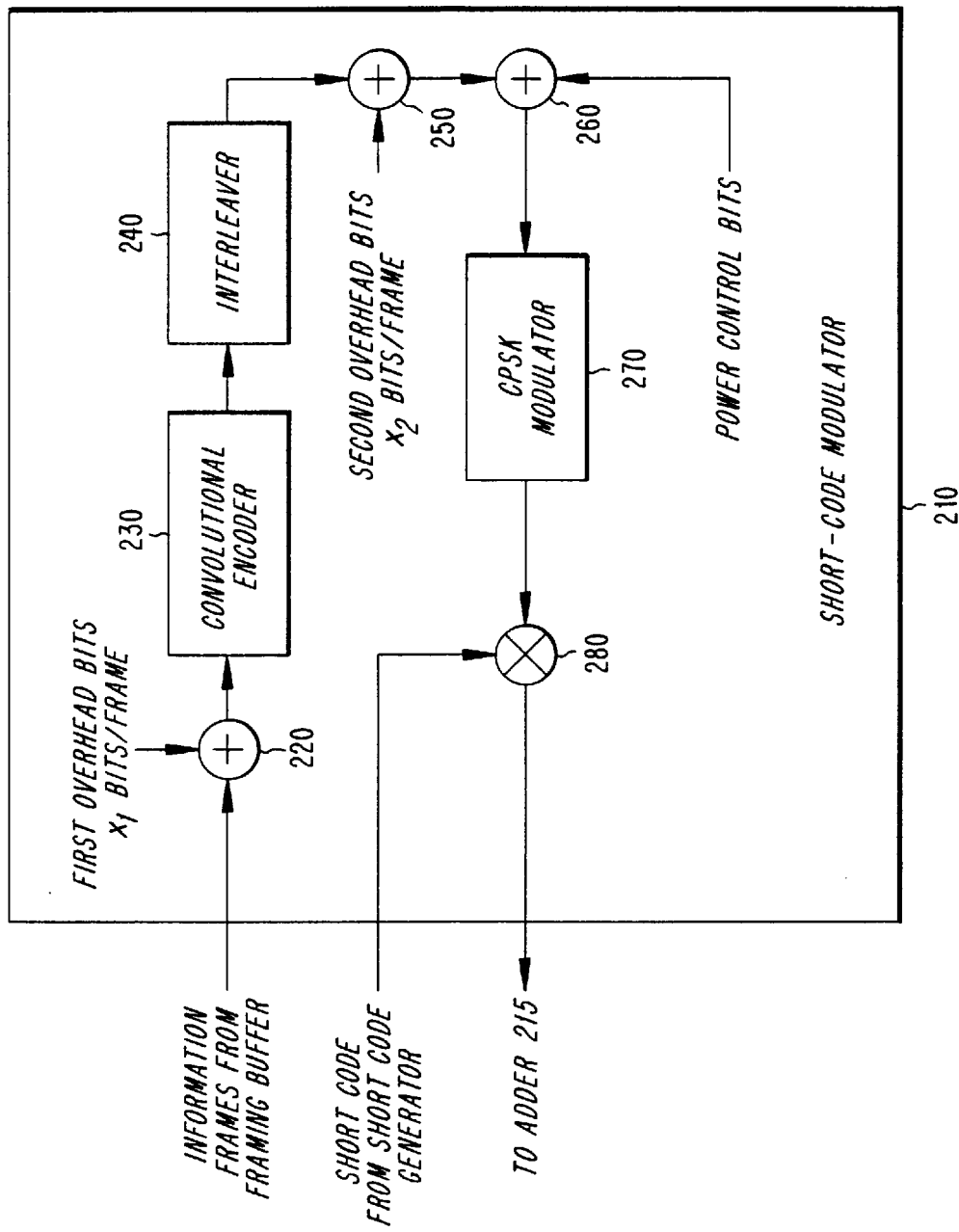
FIG. 2B is a schematic illustration of a short-code modulator in accordance with one embodiment of the present invention.

Arranging the information data bitstream into a sequence of information frames allows the information data to be processed conveniently in short-code modulators 210a–M. Referring now to FIG. 2B, a schematic illustration of the short-code modulators 210a–M, is generally shown as 210. Prior to channel coding in convolutional encoder 230, the first overhead bits ($X_1$) comprising, for example, a portion of the cyclic redundancy check (CRC) bits are added to the information frame in time multiplexer 220. The frame comprising the information bits and the first overhead bits is coupled to convolutional encoder 230 and subjected to channel coding using, for example, a rate ⅓ convolutional encoder which adds redundancy to the frame. The encoded frame is then coupled to bit interleaver 240 where the encoded frame is subjected to block-wise bit interleaving. After interleaving, the second overhead bits $X_2$ are added to the encoded and interleaved frame in time multiplexer 250. Downlink power control bits are also added to the encoded/interleaved frame in time multiplexer 260. The downlink power control bits instruct the mobile station to increase or decrease its transmitted power level. After the insertion of the power control bits, each frame is coupled to quadrature phase shift keying (QPSK) modulator 270. Those skilled in the art will appreciate that modulations other than QPSK modulation could also be used. QPSK modulator 280 maps the input bits, or symbols, into a sequence of complex symbols. The output of QPSK modulator is a complex sequence of symbols represented by, for example, Cartesian coordinates in the usual form I+jQ. Spreading of the output of the QPSK modulator is performed using so-called short-codes. Other encoding, interleaving, and modulation combinations are possible.

Short-Codes

Referring back to FIG. 1, each radio base station 170a–n transmits a unique downlink signal to enable mobile terminals 120a–m to separate the signals broadcast in adjacent cells or adjacent sectors (i.e., inter-cell signals) from the downlink signals received in the cell where the mobile terminal is located. Further, signals transmitted to individual mobile terminals in a particular cell, are orthogonal to one another to separate the signals of multiple mobile stations 120a–m operating in the same cell (i.e., intra-cell signals). According to the present invention, downlink transmissions to multiple users in the same cell, or same sector, are separated by spreading the modulated signal with different orthogonal short-codes.

Parallel short-code channels representing a high bitrate signal are separated from each other in the same way downlink traffic signals to mobile terminals operating in the same cell are separated, namely by assigning different short codes $S_M$(real) to each parallel CDMA channel.

In one embodiment, the short orthogonal codes are real-valued orthogonal Gold codes with a length of one symbol interval. For example, with a 120 kbps total bit rate (60 kbps on each quadrature branch) and a chip rate of 7.68 Mcps, the code length is 128 chips. Orthogonal Gold codes are ordinary Gold codes of length $2^m-1$, where a zero (or one) is added to the end of all code words producing $2^m$ orthogonal code words, each of length $2^m$. Gold codes are known to those of skilled in the art. Referring again to FIG. 2A, the output of each short-code modulator 210a–M is coupled to adder 215 where the individually spread signals of each information frame are formed into a single composite signal.

Long-Codes

Figure 2C:
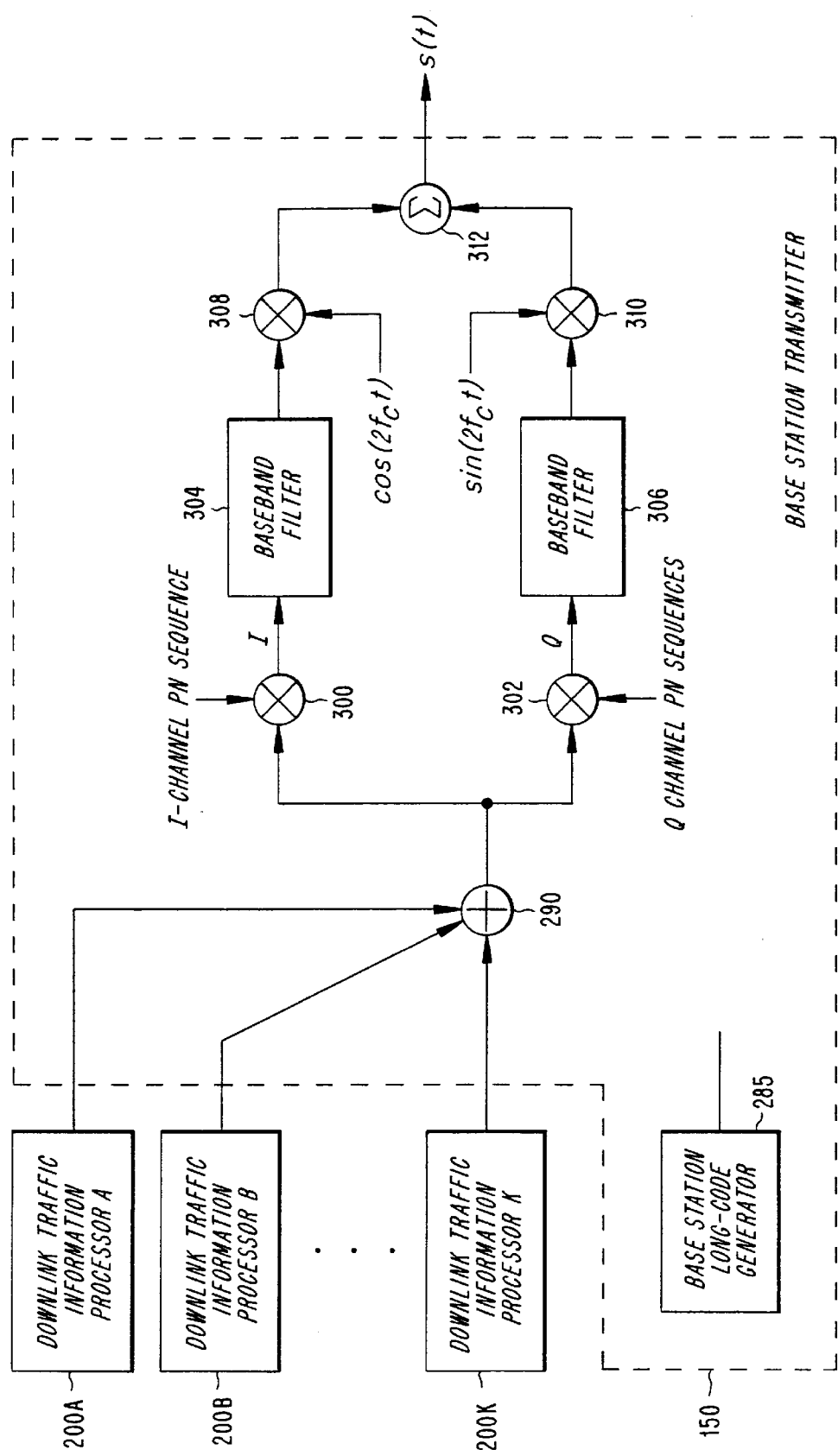
FIG. 2C is a schematic illustration of a base station transmitter in accordance with one exemplary embodiment of the present invention.

Referring now to FIG. 2C, the composite signals from each downlink traffic information processor 200A–K, are coupled to base station transmitter 150. The signals from each downlink traffic information processor are added in block 290. In order to separate downlink signals transmitted from different base stations, each base station 170a–n is assigned a unique long code. In one embodiment of the present invention the long code may be complex-valued: for example, an ordinary Gold code of length $2^{41}-1$ chips. After scrambling (at blocks 300 and 302) the composite signal with the long-code generated by the long code generator 285, the signal is filtered (blocks 304, 306), converted (blocks 308, 310), summed (block 312), amplified and transmitted according to known techniques.

Discontinuous Transmission

Figure 3A:
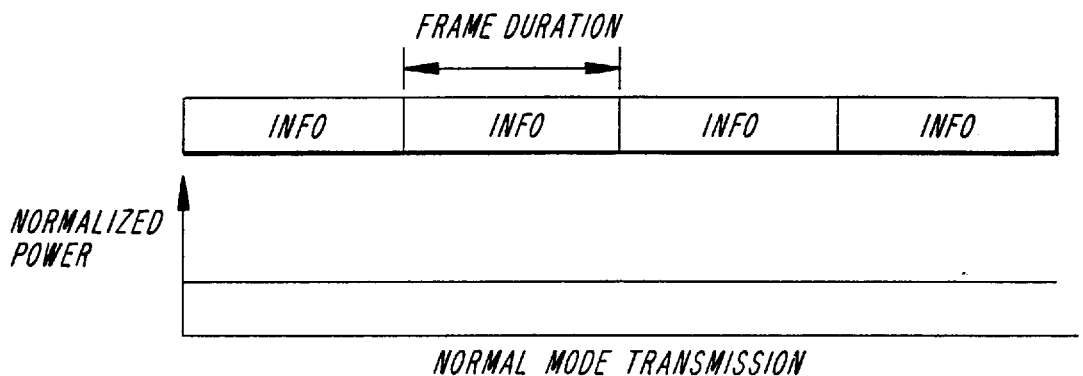
FIGS. 3A and 3B are examples of a normal mode transmission and a compressed mode transmission, respectively, during four frames.

Normally in CDMA systems, information is transmitted in a structure of frames with fixed length, e.g., 5–20 ms. Information to be transmitted within a frame is coded and spread together. This information is spread over each frame, resulting in continuous transmission during the whole frame at a constant power level, as shown for example in FIG. 3A. This type of full frame, continuous transmission is denoted herein as "normal mode transmission".

Figure 3B:
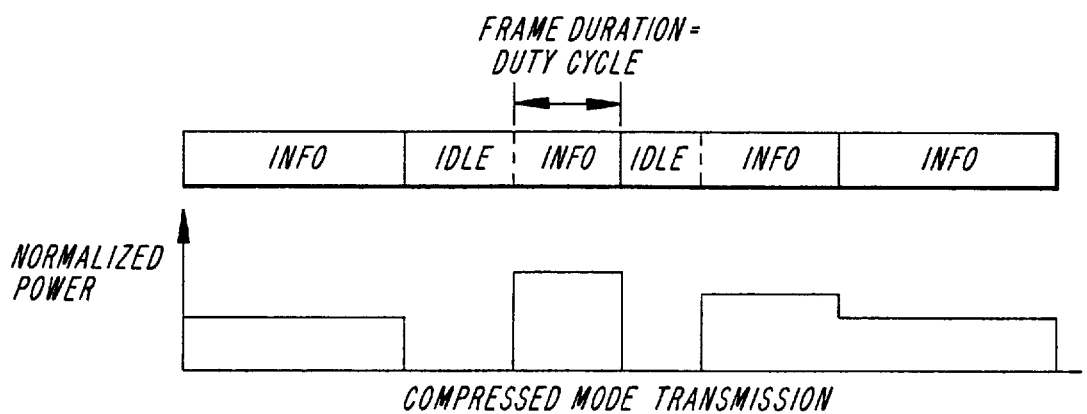

As described above, the present invention introduces discontinuous transmission into CDMA systems for, e.g., reliable handover candidate evaluation. According to the present invention, this is achieved by temporarily increasing the rate of the channel coder by deleting bits from the coded bit stream (i.e., puncturing the code). This results in coded information which is compressed into a portion of a frame, leaving a residual, idle interval in which no power is transmitted, as shown in FIG. 3B. This is referred to herein as "compressed mode transmission". An illustrative example will serve to further explain how idle intervals can be created according to the present invention.

Punctured convolutional coding techniques in digital communication systems are, per se, known as shown by the teachings of the following documents each of which are incorporated herein by reference: U.S. Pat. No. 5,029,331, issued on Jul. 2, 1991, to Heichler et al.; U.S. Pat. No. 4,908,827, issued on Mar. 13, 1990, to Gates; U.S. Pat. No. 4,462,101, issued on Jul. 24, 1984, to Yasuda et al.; Punctured Convolutional Codes of Rate (n−1)/n and Simplified Maximum Likelihood Decoding, by J. Bibb Cain, George C. Clark, Jr., and John M. Geist, in *IEEE Transactions on Information Theory*, Vol. IT-25, No. 1, January 1979, pp. 97–100; and High Rate Punctured Convolutional Code for Soft Decision Viterbi Decoding, by Yutaka Yasuda, Kanshiro Kashiki, and Yasuo Hirata, in *IEEE Transactions on Communications*, Vol. COM-32, No. 3, March 1984, pp. 315–319.

In general, communication systems using punctured convolutional coding include a coder for coding a digital input to be transmitted from a transmitter and a decoder for decoding the coded input received at the receiver. The coder includes a convolutional coding circuit which receives the digital input and outputs a convolutional coded output. The digital input is coded by the convolutional coding circuit so that for every k-bits inputted into the convolutional coding circuit, a corresponding n-bits, where n>k, is outputted. The k-bits inputted and the corresponding n-bits outputted are referred to as k-tuples and n-tuples, respectively. A convolutional coding rate for the convolutional coding circuit is defined as the ratio of the number of k-bits inputted to the number of n-bits outputted, and can be expressed as k/n. For example, the coding rate is ½ when for each bit inputted into the convolutional coding circuit there is a corresponding two bits outputted.

In order to increase the code rate of the coder, the convolutional coded output is passed through a puncturing circuit which includes a transmission mask circuit and deleting pattern memory for transmitting only selected bits of the convolutionally coded output. The puncturing circuit outputs a punctured output having a punctured code rate of z/q. A punctured code rate of z/q means that for every z input bits inputted into the convolutional coding circuit q bits are outputted from the puncturing circuit.

The desired punctured code rate is achieved by passing a convolutional coded output through the transmission mask circuit and puncturing the convolutional coded output on a block-by-block basis. Each block to be punctured is formed from a plurality of n-tuples and is referred to as a puncturing block. The number of n-tuples used to form each puncturing block is currently determined by recognizing that to provide a punctured code rate of z/q, where z=γk, for a convolutional coded output of rate k/n, at least γ convolutionally coded n-tuples must be grouped and punctured as a puncturing block to achieve the desired punctured code rate. Accordingly, the bit length of each puncturing block is equal to γ convolutionally coded n-tuples multiplied by the number of bits in each n-tuple. The bit length of the puncturing block can be expressed as L=γn.

The puncturing blocks are punctured according to a deleting pattern which has a length equal to that of a puncturing block. The bits of the deleting pattern have a one-to-one correspondence with the bits in each of the puncturing blocks. Accordingly, the deleting pattern is chosen to have a length that can be expressed as L=γn. The deleting pattern chosen has the minimum bit length necessary to achieve the desired punctured code rate of z/q for a convolutional coding rate of k/n.

The deleting pattern used by the puncturing circuit is an L-length block of ones and zeros, with each one representing a transmission bit and each zero representing a non-transmission bit. (The transmission bits and non-transmission bits are also referred to as non-deleting bits and deleting bits, respectively.) The ratio of ones to zeros in the L-length deleting pattern is chosen to achieve the desired punctured code rate. It is the relative number to zeros in the deleting pattern that determines the punctured code rate.

For example, a ⅔ punctured rate is achieved for a rate ½ convolutional coding circuit by using a deleting pattern of length four (i.e., L=zn=2×2=4). The length four deleting pattern is chosen to have three transmission bits and one non-transmission bit, i.e., a puncturing rate of ¼, so that the new punctured rate of ⅔ is achieved.

There are a plurality of different deleting patterns having the same ratio of ones to zeros and having the same bit length but having unique arrangements or patterns of ones and zeros. The arrangement or pattern of ones and zeros in a deleting pattern affects the distance properties of the punctured code. To minimize the bit error rate of the communication system, a deleting pattern having the desired bit length and ratio of ones to zeros is typically chosen in an attempt to optimize the distance properties of the punctured code.

To select an optimal deleting pattern once the length and ratio of ones to zeros is determined, a puncturing table of potential deleting patterns in which distance properties have been calculated for each deleting pattern can be consulted. Selecting an optimal deleting pattern for a given deleting pattern length and ratio of ones to zeros is well-known as indicated by the above incorporated documents. The optimal deleting pattern selected from a puncturing table is used by the puncturing circuit in puncturing on a block-by-block basis the convolutional coded output.

Figure 4:
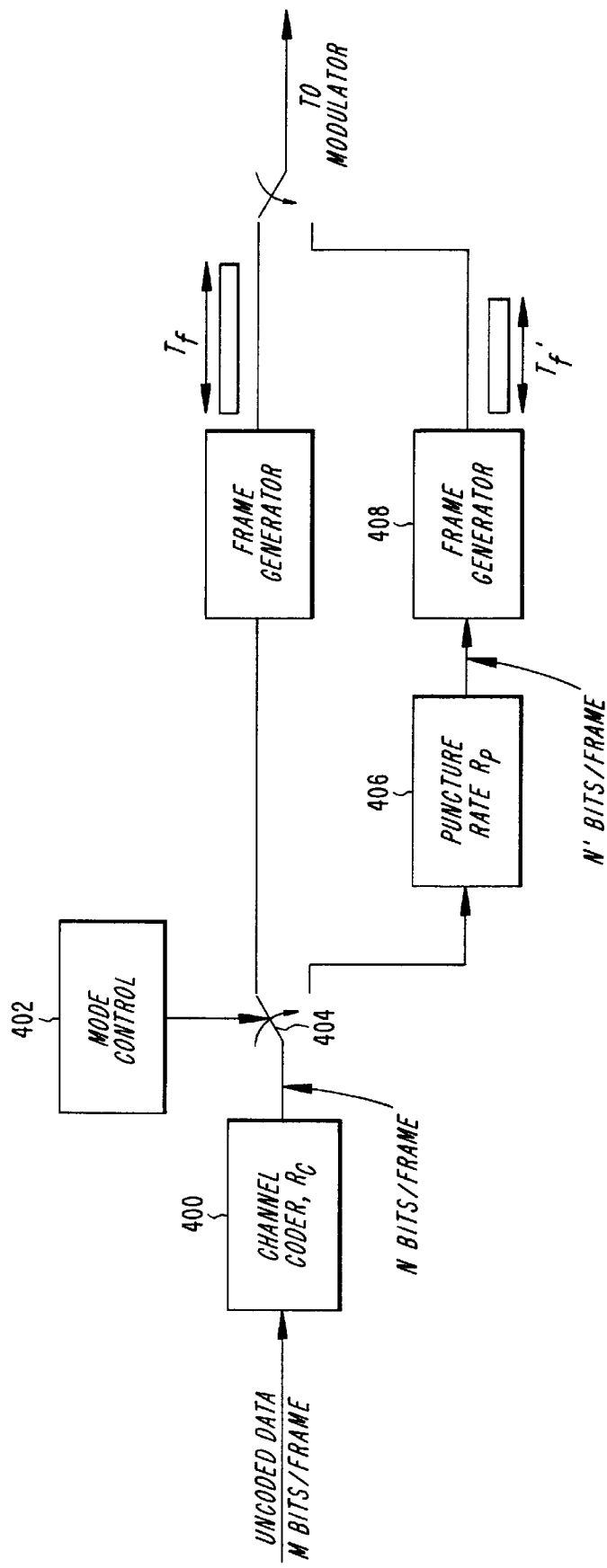
FIG. 4 is a block diagram of alternate signal processing branches for providing normal mode and compressed mode transmissions.

According to the present invention, puncturing is selectively performed to create idle intervals when needed, for example, to perform inter-frequency measurements. Referring to FIG. 4, consider an uncoded data stream having M bits/frame entering convolutional channel coder 400. The coder 400 can, for example, correspond to convolutional encoder 230 in FIG. 2B. Assume that the coder has an encoding rate of $R_c$ and that the data stream is provided in frames having length $T_f$. This means that the output N of channel coder 400 will be $N=M/R_c$. When frequency measurements are to take place, mode control device 402 operates switch 404 to move from the upper processing branch of FIG. 4 (associated with normal mode transmission) to the lower signal processing branch (associated with compressed mode transmission). In the lower signal processing branch, the coded bit stream is punctured at block 406 with a puncturing rate $R_p$, i.e., every $1/R_p$th bit is removed. The number of bits per frame is thus reduced to $N'=N*(1-1/R_p)$. These N' bits/frame are then provided to frame generator 408 (e.g., interleaver 240 in FIG. 2B) resulting in a frame having length $T_f$ being sent to the modulator (e.g., modulator 270 in FIG. 2B).

For a given channel bit rate, the data of a frame can now be transmitted in a time interval of length $T_f'=T_f * N'/N$. The remaining time interval of length $T_i=T_f-T_f'$ can be used for inter-frequency measurements.

Idle Time Usage

Having created idle time for a mobile station's receiver, this idle time can be put to a number of advantageous uses. First, the receiver can use this time to scan other frequencies. The evaluation of carrier frequencies other than that which a mobile station is currently allocated is performed by using the compressed transmission mode in the downlink or uplink on a regular, predetermined basis. The mobile station performs measurements (e.g., carrier signal strength, pilot channel signal strength or bit error rate) on other carrier frequencies during the idle part of the compressed mode frame since during this time it is not required to listen to the base station to which it is currently linked. After switching to another frequency, the evaluation of that frequency can be carried out in any suitable fashion, e.g., such as disclosed in U.S. Pat. No. 5,175,867 to Wejke et al. The measurements are relayed to the network (through the currently linked base station or base stations), providing the information used for mobile assisted handover (MAHO).

The compressed mode is used intermittently at a rate determined by the mobile station or network in this exemplary embodiment, however, it may be preferable for the network to control the usage of compressed mode transmission for the downlink. The mobile station or network can determine the frequency of use of the compressed mode based on a variety of factors, such as the radio propagation conditions, the mobile station's speed and other interfering factors, the relative call density, and the proximity to cell boarders where handover is more likely to be needed. This information, in conjunction with the details of the measurement and handover algorithm used in the system, can be used by mode control device 402 to time the movement of switch 404.

Execution of a call handover can also be handled in the compressed mode in an exemplary embodiment of the present invention. Two different handover processes can be implemented using the idle time provided by the compressed mode, specifically seamless handover and soft handover. For the purposes of seamless handover, the mobile station's receiver can use the idle time to receive time slots from the new base station and use known synchronization techniques to synch to the new base station before the handover occurs, thereby speeding up the handover process by establishing communication with the new base station before dropping its connection with the old base station.

For soft handover, after deciding on handover to a new base station (or base stations) broadcasting on another carrier frequency, the compressed mode is entered. Communication with the old base station(s) is maintained while establishing a new link during the idle part of the frame. By maintaining the old link(s) after the new link is synchronized, communication to all base stations simultaneously can be employed (establishing macro-diversity on two or more carrier frequencies) making the scheme a make-before-break method. This scheme for soft inter-frequency handover can be used for both up- and down-links. The handover is completed by dropping the old link(s) and returning to normal mode transmission.

The duty cycle of the information part of a frame to the frame duration is controlled on a frame by frame basis. For measurements on other frequencies, the duty cycle can remain relatively high (e.g., 0.8) since only a short period of time is needed for the measurement. For execution of macro diversity between two frequencies, the same information is sent on both. Therefore, the duty cycle should be approximately 0.5. The compressed mode is used only intermittently and the normal mode (duty cycle=1) is used the remainder of the time.

To control the transmission quality, the transmission power used during the information part of the frame is a function of the duty cycle, in an exemplary embodiment of the present invention. For example, the transmission power P can be determined as:

$$P = \frac{P_1}{\text{Duty Cycle}}$$

wherein $P_1$ = power used for normal mode transmission. This increased power is needed to maintain transmission quality in the detector if the duty cycle is reduced. During the rest of the frame, i.e., the idle part, the power is turned off.

The variation in total transmitted power from a base station can be smoothed by staggering (spreading in time) the deployment of compressed mode over a number of users in a certain time span. Since signal strength measurement on another carrier frequency is likely to require only a fraction of a frame, the duty cycle can be made high, thereby reducing the variation in the power transmission.

The present invention's use of normal and compressed mode frames provides the ability to exploit the advantages of slotted transmission/reception in hierarchical cell structures while using DS-CDMA but without reducing the spreading ratio. This makes it possible to measure other carrier frequencies, thereby providing reliable handover decisions. Further, handover execution between carrier frequencies can be made seamless by establishing a new link before releasing the old one. This can be done without the need for two receivers.

The preceding description of the preferred embodiments are provided to enable any person skilled in the art to make and use the present invention. Various modifications to these embodiments will be readily apparent to those skilled in the art, and the principles described herein may be applied without departing from the scope and spirit of the present invention. Thus, the present invention is not limited to the disclosed embodiments, but is to be accorded the widest scope consistent with the claims below.

What is claimed is:

1. A method of code division multiple access in cellular communications, wherein information is transmitted in frames having a specific time duration, said method comprising the steps of:

channel encoding a symbol stream associated with a frame to be transmitted to produce a coded symbol stream;

selectively increasing a channel coding rate of said coded symbol stream to generate a compressed mode frame, wherein a compressed mode frame includes at least one first part having a time duration less than said specific time duration and containing a complete coded information signal, and a second part;

impressing said coded symbol stream to be transmitted on a signature sequence to produce a spread information signal; and transmitting said coded, spread information signal as either a normal frame or as said compressed frame based upon a result of said selective increasing step.

2. The method of claim 1, wherein said step of channel encoding further comprises the step of:

convolutionally encoding said symbol stream.

3. The method of claim 1, wherein said step of selectively increasing further comprises the step of:

selectively puncturing said coded symbol stream.

4. A method according to claim 1, comprising a further step of increasing a transmission power level used during said first part of a compressed mode frame as a function of a duty cycle, defined as a ratio of the time duration of said at least one first part to said specific time duration, of said compressed mode frame.

5. A method in accordance with claim 1, wherein no power is transmitted during said second part.

6. A method according to claim 1, wherein said compressed mode is used in one radio link without coordination with use of compressed mode in other radio links.

7. A method according to claim 4, further comprising the step of smoothing variations in total transmitted power by spreading in time use of compressed mode frames over a number of users in a determined time span.

8. A method according to claim 1, wherein a frequency of use of said compressed mode is based on one or a combination of one or more of the following factors: speed of a mobile station, interference load, relative call density, and proximity to cell boarders.

9. A method according to claim 1, wherein the compressed mode is used in a down-link.

10. A method according to claim 1, wherein the compressed mode is used in both a down-link and an up-link.

11. A method according to claim 1, wherein the compressed mode is used in an up-link.

12. A method according to claim 9, comprising the further step of performing measurements, in a mobile station, on carrier frequencies during said second part of a down-link compressed mode frame.

13. A method according to claim 10, comprising the further step of performing measurements, in a mobile station, on carrier frequencies during said second part of a down-link compressed mode frame.

14. A method according to claim 10, comprising the further step of utilizing said compressed mode when synchronizing on a new carrier frequency and establishing a new radio link during said second part of a compressed mode frame.

15. A method according to claim 14, comprising the further step of maintaining communication on both a presently used radio link and said new radio link, using said second part of a compressed mode frame for communicating on said new radio link.

16. A method according to claim 15, comprising the further step of dropping said presently used radio link and returning to a normal mode frame transmission on said new radio link, wherein said normal mode frame consists of only said coded information during the entirety of said specific time duration.

17. A method according to claim 13, comprising the further steps of utilizing said compressed mode when synchronizing communication on a new carrier frequency and establishing a new radio link during said second part of a compressed mode frame.

18. A method according to claim 17, comprising the further step of maintaining communication on both a presently used radio link and said new radio link using said second part of a compressed mode frame for communicating on said new radio link.

19. A method according to claim 18, comprising the further steps of dropping said presently used radio link and returning to normal mode frame transmission on said new radio link, wherein said normal mode frame consists of only said coded information during the entirety of said specific time duration.

20. A method according to claim 12, comprising the further step of performing handover evaluation using said measurements of a carrier frequency differing in frequency from a carrier frequency upon which a present link is established.

21. A method according to claim 13, comprising the further step of performing handover evaluation using said measurements of a carrier frequency differing in frequency from a carrier frequency upon which a present link is established.

22. A method according to claim 21, comprising the further steps of utilizing said compressed mode when synchronizing communication on a new carrier frequency and establishing a new link, based on said handover evaluation, during said second part of a compressed mode frame.

23. A method according to claim 22, comprising the further step of maintaining communication on both a presently used radio link and said new radio link, using said second part of a compressed mode frame for communicating on said new radio link.

24. A method according to claim 23, comprising the further steps of dropping said presently used radio link and returning to a normal mode frame transmission, wherein a normal mode frame consists of only said coded information during the entirety of said specific time duration.

25. A method according to claim 10, comprising the further step of utilizing said compressed mode when executing seamless handover by: performing communications on a present radio link during said at least one first part, synchronizing communication on a new carrier frequency during said second part, establishing a new radio link during said at least one second part, dropping the present link when communication on said new radio link has been established, and performing communications on the new radio link using a normal mode transmission, wherein a normal mode frame consists of only said coded information during the entirety of said specific time duration.

26. A method according to claim 13, comprising the further step of utilizing said compressed mode when executing seamless handover by performing communications on a present radio link during said first part, synchronizing communications on a new carrier frequency during said second part, establishing a new radio link during said second part, dropping the present link when communication on said new radio link has been established, and performing communications on the new radio link using a normal mode transmission, wherein a normal mode frame consists of only said coded information during the entirety of said specific time duration.

27. A method according to claim 21, comprising the further steps of utilizing said compressed mode when executing seamless handover by:

performing communications on a present link during said first part, selecting a new carrier frequency based on said handover evaluation, synchronizing communication on said new carrier frequency during said second part, establishing a new radio link during said second part, dropping the present link when communication on said new radio link has been established, and performing communications on the new radio link using a normal mode transmission, wherein a normal mode frame consists of only said coded information during the entirety of said specific time duration.

28. An apparatus for transmitting information in a code division multiple access (CDMA) system transmitting information in frames of specific time duration, said apparatus comprising:

means for encoding and framing data in either a normal mode, wherein a normal mode frame includes said coded information during the entirety of said specific time duration, or, a compressed mode, wherein a compressed frame includes at least one first part of less than said specific time duration, said at least one first part containing a complete CDMA coded information signal, and a second part, said encoding and framing means including an input and an output;

means for controlling which of said compressed mode and said normal mode is used in said encoding and framing means; and means for transmitting said CDMA coded information signal output of said encoding and framing means.

29. The apparatus according to claim 28, wherein said means for encoding and framing data includes a first signal processing branch associated with said normal mode and second signal processing branch associated with said compressed mode and wherein said mode controlling means includes a switch whereby said mode controlling means can selectively switch a signal stream into one of said first and second branches.

30. The apparatus according to claim 28, wherein said mode controlling means selects a mode according to a measurement/handover algorithm.

31. The apparatus according to claim 28, wherein said apparatus forms part of a mobile station.

32. The apparatus according to claim 28, further comprising means for decoding channels with fixed spreading ratios.

33. The apparatus according to claim 28, wherein said apparatus is part of a base station.

34. The apparatus according to claim 30, wherein part of said algorithm is implemented in a mobile station and part of said algorithm is implemented in a base station.

35. The apparatus according to claim 28, wherein one part of said apparatus is located in a mobile station and another part of said apparatus is located in a base station.

36. The apparatus according to claim 28, wherein power supplied to said means for transmitting during at least one first part of a frame is controlled by said mode controlling means.

37. The apparatus according to claim 29, wherein said second branch includes a code puncturing unit.

38. The apparatus according to claim 30, wherein a duty cycle of the compressed mode frame of said receiver means is controlled by said mode controlling means.

39. A CDMA transmitter comprising:

a node for receiving a stream of uncoded data bits;

a channel coder for encoding said stream of data bits;

a first signal processing branch for receiving said encoded stream of data bits and generating a normal frame for transmission;

a second signal processing branch for receiving said encoded stream of data bits, deleting some of said encoded bits and generating a compressed frame for transmission;

a switch operable to select one of said first and second signal processing branches; and downstream processing circuitry for receiving one of said normal and said compressed frame and transmitting same.

40. The CDMA transmitter of claim 39, wherein said channel coder is a convolutional encoder.

* * * * *